United States Patent
Corkhill et al.

(12) 
(10) Patent No.: US 6,280,847 B1
(45) Date of Patent: Aug. 28, 2001

(54) LAMINATED GLAZINGS

(75) Inventors: Philip Harold Corkhill, Wigan; Malcolm Francis Green, Liverpool; Neil Winstanley, St. Helens; Paul Arthur Holmes, Northwich, all of (GB)

(73) Assignee: Pilkington PLC (GB)

( * ) Notice: Subject to any disclaimer, the term of this patent is extended or adjusted under 35 U.S.C. 154(b) by 0 days.

(21) Appl. No.: 09/071,093

(22) Filed: May 1, 1998

(30) Foreign Application Priority Data

May 3, 1997 (GB) .................................................. 9708989

(51) Int. Cl.$^7$ ..................... B32B 27/00; B32B 27/40; B32B 17/06; B32B 7/02; B60J 5/00
(52) U.S. Cl. ..................... 428/423.1; 296/84.1; 296/77.1; 296/146.1; 428/213; 428/214; 428/215; 428/423.3; 428/425.5; 428/425.6; 428/426
(58) Field of Search ............................... 428/423.1, 425.5, 428/426, 215, 213, 214, 425.6, 423.3; 296/84.1, 77.1, 146.1

(56) References Cited

U.S. PATENT DOCUMENTS

| | | | |
|---|---|---|---|
| 4,041,208 | * | 8/1977 | Seeger et al. .......................... 428/424 |
| 5,137,787 | * | 8/1992 | Sheperd .............................. 428/423.7 |
| 5,521,760 | * | 5/1996 | De Young et al. ................... 359/601 |
| 6,156,417 | * | 12/2000 | Edwards et al. ..................... 428/215 |

FOREIGN PATENT DOCUMENTS

| | | |
|---|---|---|
| 0 295 596 | 12/1988 | (EP) . |
| 2 168 506 | 8/1973 | (FR) . |
| 2 624 428 | 6/1989 | (FR) . |
| 93 22383 | 11/1993 | (WO) . |
| 99 39906 | 8/1999 | (WO) . |

* cited by examiner

*Primary Examiner*—Patrick D. Niland
(74) *Attorney, Agent, or Firm*—Marshall & Melhorn, LLC

(57) ABSTRACT

An intrusion resistant laminated glazing, suitable for automotive use, comprises an impact resistant ply of rigid thermoplastic polyurethane sensitive to ultra-violet radiation and, outside said ply, an ultra-violet absorbing or reflecting ply. The ultra-violet absorbing ply may be of thermoplastic polyurethane interlayer material which serves to bond the rigid thermoplastic polyurethane ply to outer glass plies. By using interlayer materials of low modulus to bond the rigid thermoplastic ply to outer glass plies, a product with good impact resistance and intrusion resistance is achieved.

20 Claims, 3 Drawing Sheets

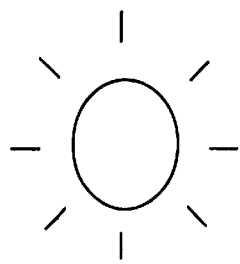
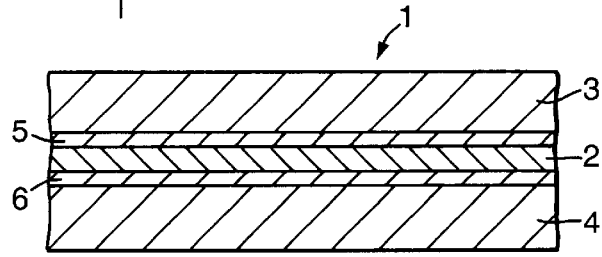
Fig.1.
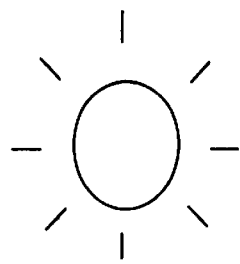
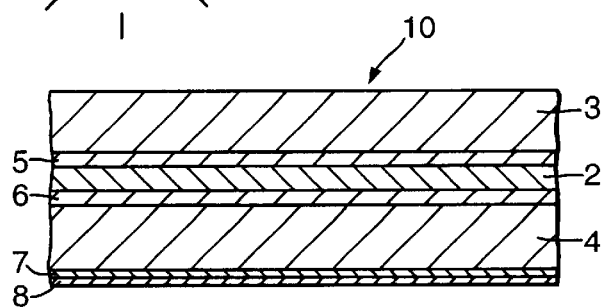
Fig.2.
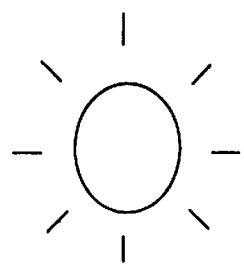
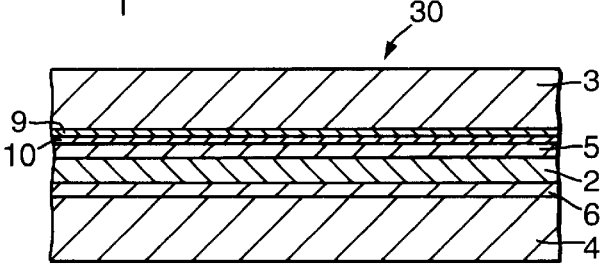
Fig.3.

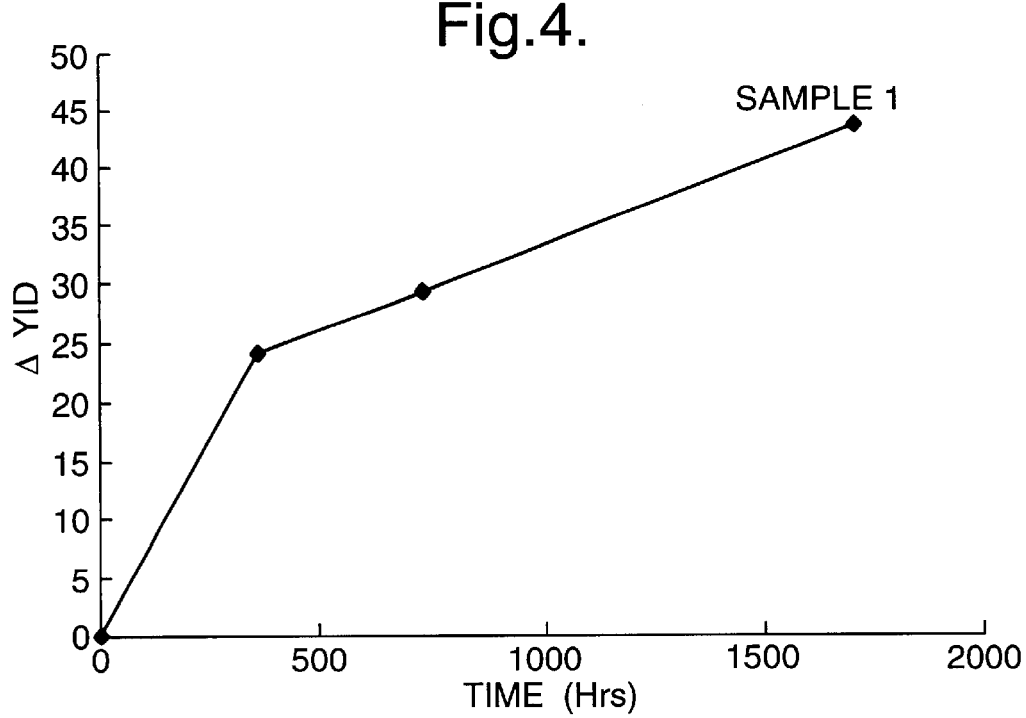
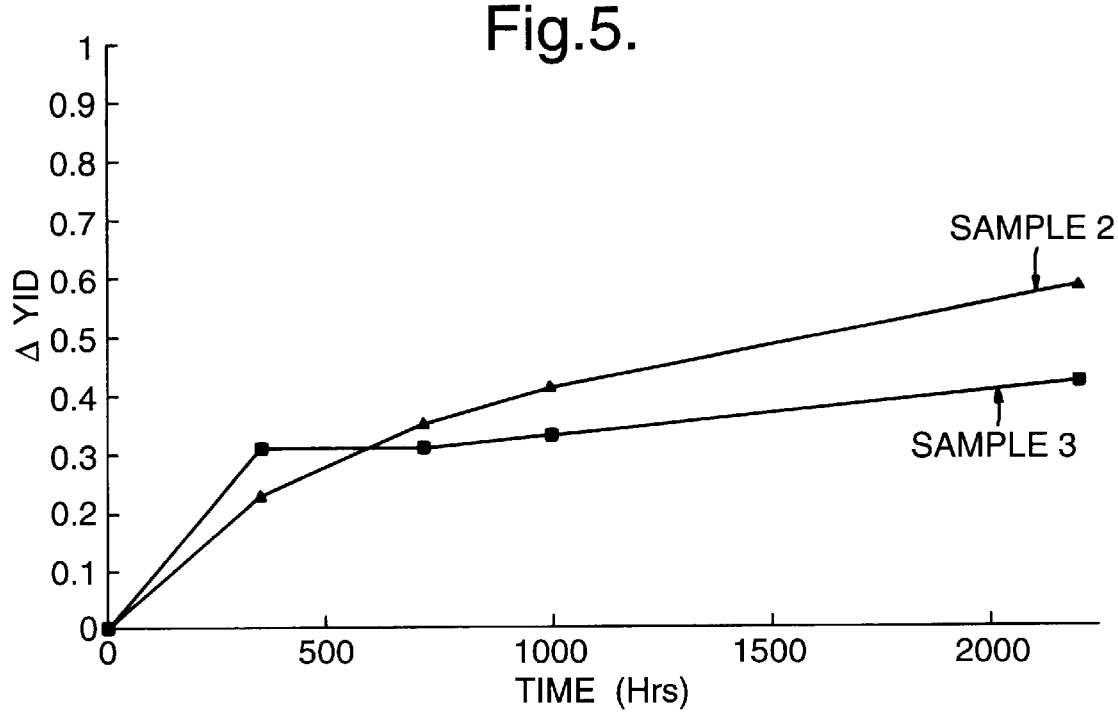

LAMINATED GLAZINGS

BACKGROUND OF THE INVENTION

1. Field of the Invention

This invention relates to glazings, and in particular to laminated glazings having a high intrusion resistance.

2. Summary of Related Art

Glazings for automotive use comprise safety glass which may be laminated (widely used for windscreens) or toughened (widely used for sidelights and backlights). Both types of glazing provide some degree of impact resistance, with laminated glazings having certain advantages over toughened glass so that, although laminated glazings are more expensive to manufacture than toughened glass, it would be desirable for all automotive glazings to be laminated to give improved intrusion resistance and to improve occupant retention in collisions. However, while conventional laminated glass (using polyvinylbutyral interlayer) provides better intrusion resistance than toughened glass, it will not resist a sustained attack especially when (as in the case of opening side lights) it is not permanently secured around its periphery by the glazing system used.

Attempts have been made to improve the impact resistance of laminated glazings by incorporating polycarbonate as an impact resistant ply in the laminate. Unfortunately, a polycarbonate ply at least 3 mm thick is required because polycarbonate is prone to stress cracking at lower thicknesses. However, while a 3 mm polycarbonate layer provides sufficient impact resistane for most purposes in a laminated glazing, when a 3 mm polycarbonate is laminated between glass panes (to provide the durability required for most uses) the resultant glazing becomes relatively thick and heavy, making it unsuitable for general automotive use.

A new family of engineering thermoplastic polymers have become available in recent years, the rigid thermoplastic polyurethanes, (RTPU), which are finding use in load-bearing engineering applications. Unfortunately, such polymers have poor resistance to ultra violet radiation, presumably due to inclusion of aromatic units in the polymer chains (the flexible thermoplastic polyurethanes currently used in aircraft glazings are aliphatic in character, and do not suffer the same deterioration on exposure to ultra-violet radiation). Thus they would not normally be considered suitable for use in external glazings.

We have now found that a rigid thermoplastic polyurethane ply may be satisfactorily protected from ultra-violet radiation so that it becomes suitable for external use by incorporating it in a laminate with an ultra-violet absorbing and/or reflecting ply outside (i.e. between the rigid thermoplastic ply and the source of incident ultra-violet light, normally the sun) the rigid thermoplastic ply, providing a durable, impact resistant glazing, suitable for automotive use, without the disadvantages of thickness and weight referred to above.

BRIEF SUMMARY OF THE INVENTION

According to the present invention there is provided a laminated glazing including an impact resistant ply of rigid thermoplastic polyurethane sensitive to ultra-violet radiation and, outside said ply, an ultra-violet reflecting or absorbing ply. The laminated glazing may be for automotive use.

The use of a thermoplastic material for the impact resistant layer facilitates the production of curved laminates, as it may be thermoformed to the required shape of the laminate during lamination.

The rigid thermoplastic polyurethanes have a Youngs (tensile) modulus of greater than 500 MPa, and the preferred materials have a modulus of at least 1000 MPa so that adequate stiffness can be achieved using layers no more than about 1 mm thick; in an especially preferred embodiment the tensile modulus of the impact resistant layer is about 2000 MPa or greater. The modulus values referred to herein are as measured in accordance with ASTM D638.

The rigid thermoplastic polyurethane ply will normally have a thickness of at least 0.20 mm (in order to provide adequate impact resistance) with thicknesses in the range 0.5 to 2 mm, especially 0.5 to 1.5 mm being appropriate for most applications. For applications where unnecessary weight and thickness are undesirable, it will preferably have a thickness in the range 0.4 to 0.8 mm.

The ultra-violet reflecting or absorbing ply or plies used should transmit no more than about 20% (measured in accordance with ISO 9050) of the incident ultra-violet solar radiation and preferably less than 10% and especially less than 5%. The non-transmitted ultra-violet will normally be substantially absorbed by a ply or plies of the laminate on the outside of the impact resistant ply, although it may be at least partially reflected, for example, by incorporating a reflective metal coating in the laminate outside the impact resistant ply.

A pane of high performance solar control glass (such as OPTIGRUN™ 90 or EZ-KOOL™ glass) may be used to absorb ultra-violet light, usually in conjunction with an additional ply, between an outer glass ply and the impact resistant layer, of an ultra-violet absorbing interlayer material. Such an interlayer material may itself be a thermoplastic polyvinylbutyral or polyurethane (normally an aliphatic polyurethane and much softer than the rigid thermoplastic polyurethane used for the impact resistant ply) for example, Morton PE 399 (available in commerce from Stevens Urethane of Holyoke, Mass., USA) or Tecoflex AG-8451 primerless film (available in commerce from Lehmann & Voss & Co of Hamburg, Germany). The Tecoflex primerless film has particularly good ultra-violet absorbing properties (with a 0.38 mm thick film absorbing substantially all the incident solar ultra-violet radiation measured in accordance ISO 9050) and is preferred as it may be used in thin layers without any additional absorption provided by an outer glass or reflecting metal layer.

While certain plastics, such as polycarbonates, polyurethanes and polyvinylacetals have properties which make them useful in glazing applications, for most glazing applications it is preferred to use such plastics plies in conjunction with glass outer plies because of the good optics and high durability of glass. Where the plastic plies are thermoset, as for example, acrylics, they may be bonded to glass either by incorporating a thermoplastics interlayer ply between the thermoset plastics ply and the glass and autoclaving, or by using a curable "cast-in-place" interlayer material to form an interlayer in-situ between the thermoset ply and the glass, the interlayer so formed adhering to both the thermoset ply and the glass and bonding them together. Where the plastics plies are thermoplastic, they are normally bonded directly to glass by heating the plies together under pressure in an autoclave.

Thus, it was anticipated that the rigid thermoplastic polyurethanes used in the present invention would be bonded directly to glass outer plies by autoclaving, avoiding the need to use a separate bonding layer. However, it has been found that much better adherence can be achieved, with the laminate displaying greatly enhanced energy absorption and impact resistance, if the rigid thermoplastic polyurethane ply is bonded to a glass outer ply using a relatively low modulus interlayer material, preferably a thermoplastic material to which the glass and rigid thermoplastic plies are bonded by heating under pressure.

It is found that the use, as an adhesive, of an interlayer, preferably a preformed thermoplastic interlayer, of low modulus (for example, less than 100 MPa, preferably less than 10 MPa) between the glass and the high modulus rigid polyurethane prevents cracks propagating through an outer glass ply into the rigid interlayer; it is believed that a low tensile modulus adhesive does this by blunting the crack tip. A thin adhesive layer having a thickness of as little as 10 microns and ideally about 100 microns or more can be used for this purpose, although the ready availability of suitable soft adhesive materials in greater thicknesses e.g. 0.38 mm may make it more convenient to use somewhat thicker layers (for example up to 0.4 mm) than necessary.

Thus, according to a further aspect of the present invention, there is provided a laminated glazing comprising an impact resistant ply of rigid thermoplastic polyurethane bonded to a glass ply by a low modulus adhesive interlayer. Preferably the low modulus adhesive interlayer is a thermoplastic interlayer, especially a polyurethane.

When glass plies are used, they will normally each have a thickness of at least 0.7 mm and preferably at least 1.1 mm and especially, at least for the outer ply (and commonly both plies) of automotive laminates, a thickness of about 1.5 mm or more to provide improved resistance to stone chipping. The glass plies may be semi-toughened; this is especially desirable when the laminate is to be used for opening sidelights in vehicle doors, and are required to withstand slamming of the door with the window unsupported on at least one edge. On the other hand, to avoid excessive weight and thickness, it will generally be desirable, for automotive glazings, to use glass plies of thickness not greater than about 2.6 mm, commonly no greater than 2.3 mm.

As will be appreciated from the above discussion, use of the structure of the present invention permits the production of durable glass laminates, including curved laminates, with good impact resistance and intrusion resistance, with thicknesses no greater than about 5 mm (say 5 mm±0.5 mm) or even thinner (say 4 mm±0.5 mm). Thus not only does the reduced thickness possible with the laminates of the present invention (as compared to the prior art laminates incorporating polycarbonate discussed above) save weight and material, but enables the glazings to be fitted into openings (especially openings in motor vehicles) designed to be glazed with conventional nominal 4 mm or 5 mm glazings.

BRIEF DESCRIPTION OF THE DRAWINGS

Embodiments of the invention will now be described with reference to the accompanying drawings in which:

FIG. 1 is a fragmentary cross section of a laminated glazing in accordance with the invention.

FIG. 2 is a fragmentary cross section of a modified version of the laminated glazing of FIG. 1 incorporating an anti-spall layer on its internal face.

FIG. 3 is a fragmentary cross section of a modified version of the laminated glazing of FIG. 1 additionally incorporating a reflective metal layer.

FIGS. 4 to 7 are graphs, as explained more fully below, showing changes in yellowness index with prolonged exposure to ultra-violet radiation of various laminate samples incorporating a rigid thermoplastic polyurethane ply.

DESCRIPTION OF THE PREFERRED EMBODIMENTS

Figure 6:
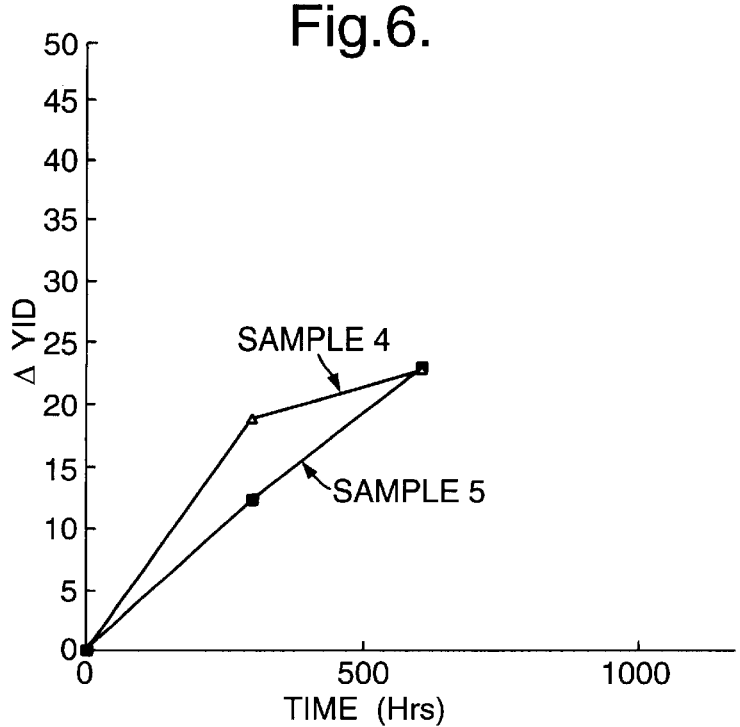

Referring to FIG. 1 of the drawings, a laminated glazing generally designated 1 comprises an impact resistant ply 2 of ISOPLAST™, (available in commerce from the Dow Chemical Company) a rigid thermoplastic polyurethane sensitive to ultra-violet radiation having a tensile modulus of about 2000 MPa, sandwiched between outer and inner glass plies 3 and 4 and adhered thereto by means of low modulus interlayers 5 and 6.

The low modulus interlayers may be of a thermoset resin cast and cured in situ between impact resistant ply 2 and glass plies 3 and 4, but are preferably of preformed thermoplastics interlayer material used to adhere the impact resistant ply to the glass plies by heating under pressure. The thermoplastic interlayer material may be a low modulus thermoplastic polyurethane or a thermoplastic polyvinylbutyral, commercially available interlayers of both materials generally having a significant ultra-violet absorption. However, it is generally preferred, especially for automotive glazing, to use a polyurethane interlayer material (at least for the interlayer 5 between rigid thermoplastic ply 2 and outer glass ply 3) since, as discussed hereinafter, commercially available polyvinylbutyral interlayer materials generally provide less satisfactory impact resistance at low temperature.

The outer glass ply 3, and optionally the inner glass ply 4, may be of an iron containing solar control glass, such as OPTIGRUN™ green glass, which contains about 0.90% by weight total iron (calculated as $Fe_2O_3$), to provide or supplement the ultra-violet absorption provided by interlayer 5. When the ultra-violet absorption provided by the glass is sufficient on its own to satisfactorily protect the impact resistant ply from incident solar ultra-violet radiation, for example, when a high light transmission is not required and a thick outer ply is satisfactory, the outer glass ply or plies may be sufficient on their own to satisfactorily protect the impact resistant ply from ultra-violet solar radiation, and it will be unnecessary for the interlayer material used to absorb in the ultra-violet. In other cases however, it may be important to supplement the ultra-violet absorption of the glass by using ultra-violet absorbing interlayer material as described above, or by using an ultra-violet reflecting coating as described hereinafter.

A typical laminated glazing of thickness about 5 mm having a structure as illustrated in FIG. 1 may comprise an impact resistant ply 2 of ISOPLAST™ rigid thermoplastic polyurethane having a thickness in the range 0.4 to 0.8 mm (for example, ISOPLAST™ 301 of thickness 0.6 mm), front and back glass plies 3 and 4 of thickness in the range 1.8 to 2.3 mm (for example, semi-toughened glass of thickness 2.1 mm) and low modulus interlayers 5 and 6 of thickness in the range 0.05 to 0.5 mm (for example, of Morton PE 399 of thickness 0.075 mm).

A typical laminated glazing of thickness about 4 mm having a structure as illustrated in FIG. 1 may comprise an impact resistant ply 2 of ISOPLAST™ rigid thermoplastic polyurethane having a thickness in the range 0.4 to 0.8 mm (for example of ISOPLAST™ 301 of thickness 0.6 mm), front and back glass plies 3 and 4 of thickness in the range 1.5 to 2 mm (for example, semi-toughened glass of thickness 1.6 mm) and low modulus interlayers 5 and 6 of thickness in the range 0.05 to 0.4 mm (e.g. for example of Morton PE 399 of thickness 0.075 mm).

A front sidelight for a Range Rover P38 having the structure shown in FIG. 1 was fabricated using 2.1 semi-toughened glass outer plies laminated to a 0.6 mm rigid thermoplastics polyurethane ply (ISOPLAST) using 0.075 mm thick interlayers of Morton PE399 thermoplastic polyurethane. The sidelight was held in place using a standard framing system and tested in accordance with BS AU 209, by impacting the glazing with a 9.5 kg anvil in a domino pattern at 150 mm from the top corner of the glazing. After 5 impacts required for BS AU 209 the glass was broken at both the front and back of the laminate. Some glass had been removed from the sample and splinters could be felt on the inside surface. After a further 20 impacts on the central point there was little change in the appearance of the glazing, however, the glass on the front surface of the main impact position was mostly powdered. A 1.5 kg short handled hammer was then used to attack the glazing, 3 heavy blows were required to puncture the laminate at the BS impact area creating a hole 77 mm by 64 mm. The bottom opposite corner was then attacked and 5 heavy blows were needed in this position to produce a similar effect. Even with these two holes in the sample the laminate could not be pulled or pushed out of the door frame.

In a comparison test, a laminated sidelight for a Range Rover P38 was fabricated using 2.1 semi-toughened glass plies laminated together with a 0.76 mm polyvinylbutyral interlayer, (that is, without the impact resistant ply used in the present invention). The glazing remained intact after the 5 BS impacts but was showing some signs of flexibility. The anvil fully penetrated the glazing after a further 5 impacts on the center point. A pull out test was attempted but a force of greater than 15 kg would have been required to remove the glazing from the frame. Attempts to remove the glazing using the claw hammer resulted in a ripping of the interlayer rather than extraction from the frame.

In an attempt to improve the impact resistance without using a rigid ply, a further sidelight was fabricated using a 1.5 mm polyvinylbutyral interlayer to laminate together two 2.1 mm semi-toughened glass plies. The glazing remained intact with no penetration after the 5 impacts required by BS AU 209. Six further impacts on the center points produced a tear in the interlayer, while the 12th impact allowed the anvil to penetrate the glazing. Removal of the anvil from the glazing also removed the sample from the frame.

In an attempt to define impact resistant glazings it should be noted that the energy absorption for penetration of toughened glass is a figure slightly above 0 Joules and a typical laminated windscreen (2.1 mm glass plies laminated 0.76 mm PVB) has a figure of 19.6 Joules. Such a typical windscreen is recognized as having desirable impact resistant properties and so a glazing with a value of energy absorption for penetration greater than that of a typical laminated windscreen can be considered as an enhanced impact resistant glazing. The measurement of energy absorption values of sample laminate structures in accordance with the present invention is described later in this specification.

Referring to FIG. 2 of the drawings, a modified form of the laminated glazing of FIG. 1, generally designated 10, comprises plies 2 to 6 corresponding to plies 2 to 6 of the glazing of FIG. 1. Anti-spall layer 8, for example of polyethylene terephthalate and having a thickness in the range 50 to 200 microns, is adhered to the (otherwise) exposed face of the internally arranged outer glass ply 5, by a thin layer of adhesive 7; suitable adhesive anti-spall products are available in commerce from, for example, Courtaulds plc of England, and the 3M Company. This anti-spall layer serves to prevent glass spall from the exposed inside face of the laminate when the glazing is subjected to impact on its outer face, and hence protect personnel within the space enclosed by the glazing (typically the driver or passenger of a motor car) from injury as a result of being struck by the glass spall.

Referring to FIG. 3 of the drawings, a further modified form of the glazing of FIG. 1, generally designated 30, comprises plies 2 to 6 corresponding to plies 2 to 6 of FIG. 1, with two additional plies 9 and 10 between outer glass ply 3 and interlayer 5. Ply 10 is a film bearing a reflecting metal layer, for example is a polyester film bearing a thin silver coating, bonded to impact resistant ply 2 by low modulus adhesive interlayer 5. A further layer of low modulus interlayer material 9 serves to bond ply 10 to the outer glass ply. In use, the reflecting metal layer serves as a solar control layer, reducing the total solar energy (heat) transmitted by the windows; it also reflects a proportion of the incident ultra-violet radiation. It will be appreciated that, when such a coating is present, it is not necessary for the glass outer ply and/or low modulus interlayer to provide as strong ultra-violet absorption to protect impact resistant ply 2 from unacceptable deterioration as would otherwise be necessary.

A typical laminated glazing of thickness about 6 mm having a structure as illustrated in FIG. 3 may comprise an impact resistant ply 2 of ISOPLAST™ rigid thermoplastic polyurethane having a thickness in the range 0.4 to 1 mm (for example, ISOPLAST™ 301 of thickness 0.6 mm) front and back glass plies 3 and 4 of thickness in the range 2.3 to 2.6 mm (for example, semi-toughened glass of thickness 2.5 mm) and low modulus interlayers 5, 6 and 9 each having a thickness in the range 0.05 mm to 0.4 mm (in one embodiment, the low modulus interlayers 5, 6 and 9 had thicknesses of 0.15 mm, 0.15 mm and 0.38 mm respectively) and a ply 10 of plastic film typically 0.05 or 0.1 mm thick bearing a reflecting silver coating. Such a laminated glazing (in common with the other laminates described above) may additionally comprise an anti-spall layer adhered to the (otherwise) exposed face of the back glass ply.

FIGS. 4 and 5 show the yellowing effect of exposing samples of rigid thermoplastics alone or protected within a laminate to ultra-violet (UVA) radiation using an accelerated weathering tester available from The Q-Panel Company of Ohio, USA. The change in yellowness index (YID) on exposure of three samples as detailed below was measured according to ASTM D1925 using a Pacific Spectragard Color System Instrument.

Sample 1 was of unprotected ISOPLAST 300 series rigid thermoplastics 1 mm thick. In sample 2, the 1 mm ISOPLAST was sandwiched between two plies of 2.1 mm clear float glass using a 0.38 mm thick interlayer of Tecoflex AG 8541 low modulus thermoplastic interlayer between the rigid thermoplastic ply and each glass ply (to provide a structure as illustrated in FIG. 1), and the lay up vacuum bagged and heated in an autoclave for 40 minutes at 125° C. and 150 pounds per square inch. Sample 3 was similar to sample 2, but with the clear glass plies replaced by 2.1 mm plies of EZ-KOOL™ iron-containing solar control glass (available in commerce from Libbey-Owens-Ford Co. of Ohio, USA).

The results show that both laminate structures provide excellent protection to the rigid thermoplastic ply with the change in yellowness index reduced from about 40 (with no ultra-violet absorbing layer) after 2000 hours to less than 1. Sample 3, using EZ-KOOL™ glass, gave even better results than Sample 2 using clear glass, although the difference was less than a factor of 2.

Figure 7:
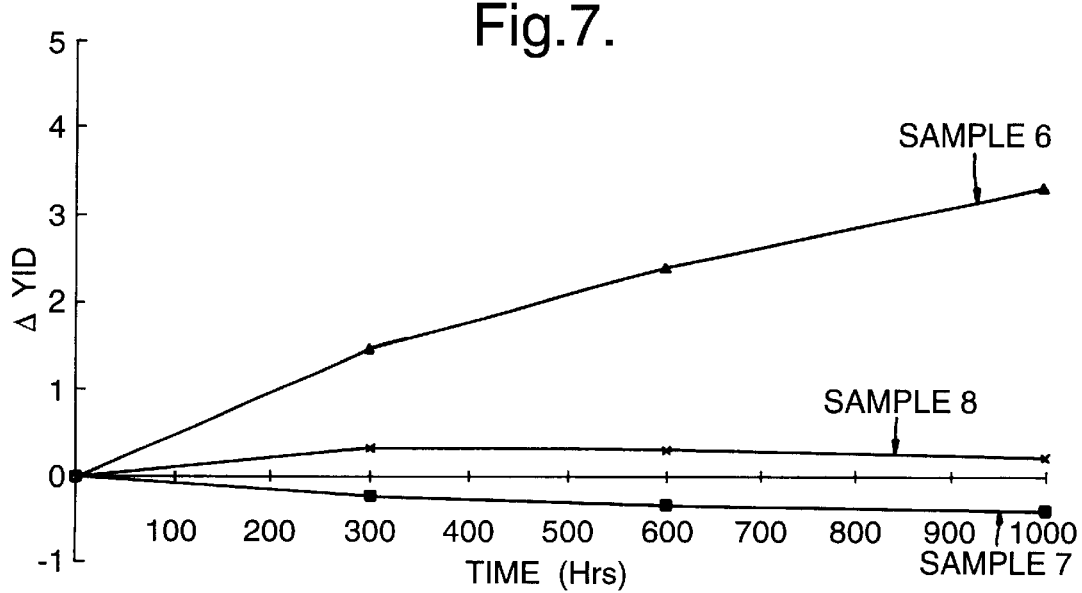

FIGS. 6 and 7 show the yellowing effect when sample laminates incorporating rigid thermoplastics ply were subjected to accelerated weathering in a XENOTEST 150S instrument, available from Heraeus Instruments, Germany. The instrument was set with a 6-1 (ir to uv filter configuration) and the rain spray cycle set to 30 minutes spray followed by 1 hour dry, and the Samples irradiated at 1570 W/M$^2$.

In Samples 4 and 5 (FIG. 6), a 1 mm ply of ISOPLAST was sandwiched between 2.1 mm glass plies without adhesive interlayers. In Sample 4 the plies were of clear glass and in Sample 5 the plies were of EZ-KOOL™ glass. The changes in yellowness index when the samples were irradiated in the XENOTEST instrument as described above are shown in FIG. 6; after about 600 hours, the yellowness index for both samples was more than 20.

In Samples 6, 7 and 8, 1 mm plies of ISOPLAST rigid thermoplastic were sandwiched between 2 thin glass plies using low modulus thermoplastics polyurethane interlayers. In Sample 6, the glass plies were of clear float glass and the interlayers of 0.15 mm PE 399. In Sample 7, the glass plies were of EZ-KOOL™ glass and the interlayers of 0.38 mm TECOFLEX AG 8541. In Sample 8, the glass plies were of EZ-KOOL™ glass and the interlayers of 0.15 mm PE 399. After 1000 hours irradiation, each of the samples had a change in yellowness index value of less than 4. Surprisingly, the yellowness index for Sample 7 actually appeared to fall on irradiation, presumably due to experimental error. When comparing the results, it can be seen that while glass provides a degree of protection from ultra-violet irradiation, with the iron-containing solar control glass providing enhanced protection (comparing Samples 6 and 8) it may not always be sufficient on its own, but much better results may be achieved using ultra-violet absorbing interlayer in combination with the glass.

Comparing the results obtained above with the results of natural weathering, we concluded that a change of yellowness index measured to ASTM D1925 of more than 20 after 1000 hours in the XENOTEST testing described above would suggest that the laminate would be unsuitable for automotive use. Preferably this value is no more than 8.

Irradiation was repeated using low modulus polyvinylbutyral interlayers in place of the polyurethane interlayers. Again, substantial protection of the rigid thermoplastic ply from yellowing was observed, although we prefer to use polyurethane interlayers as commercially available polyvinylbutyral interlayer gave poor impact performance at temperatures significantly below average ambient (see below).

It will be appreciated that uv-absorbing species may be loaded into other suitable adhesive interlayers to give them to required ultra-violet absorbing properties.

It will further be appreciated that in external glazing of the multiple layer type it is the outer side of the glazing that will usually be exposed to more ultra-violet radiation than the inner side from direct sunlight. Consequently most of the protection to ultra-violet radiation should be provided by the outermost ply or plies of the glazing. Thus it is not a departure from the present invention for a multiple layer glazing having more than one adhesive interlayer, for only one of the interlayers to be ultra-violet absorbing, usually located between the impact resistant ultra-violet sensitive layer and the major source of ultra-violet radiation.

A further series of sample tests was carried out to assess the impact resistance of rigid thermoplastics using a modified Rosand IFW5 Instrumented Impact Tester. In these tests, simply supported laminated discs of 100 mm diameter were impacted centrally and fully penetrated by a free falling 20 mm diameter spherically-tipped tool steel probe attached to a 25 kg mass. The force exerted on the probe by the specimen was measured by a force transducer located between the probe and the mass. The output from this force transducer was sampled continuously throughout the impact event by a 4000 data point, 12 bit analog to digital converter. This varying force, together with the known mass and the velocity, measured optically at a known time immediately before impact, was used to compute the variation in velocity and displacement of the mass and the instantaneous energy absorbed by the test specimen.

The results obtained for a series of samples tested are set out in accompanying Table 1, in which all thicknesses are given in millimeters, and the absorption energies are "normalized" to a rigid thermoplastics polyurethane ply thickness of 1 mm. Samples 11 to 14 were all produced by directly laminating the glass plies to the rigid thermoplastic ply at 180° C., in Samples 13 and 14, A1100 silane primer was used to enhance the glass to rigid thermoplastic ply bonds.

Samples 15 and 16 were produced by laminating the glass plies to the rigid thermoplastic polyurethane ply by a cast-in-place process using a curable fluorinated polyurethane resin to form thin low modulus thermoset adhesive plies between the rigid thermoplastics and the glass. Looking at the Table, it will be seen that a remarkable improvement in impact resistance was achieved by incorporating the low modulus adhesive layers between the glass and rigid thermoplastics plies, Samples 11 to 14 and exhibiting a total absorption energy of no more than about 5 Joules, while Samples 15 and 16, incorporating low modulus interlayers, each exhibited absorption energies of over 50 Joules. For comparison, the results shown using a laminate incorporating 1.04 mm ply of polycarbonate are shown after Sample 16, showing that use of rigid thermoplastic polyurethane plies give a potentially better performance per unit of laminate thickness than polycarbonate, as well as allowing thinner and lighter durable laminates, more suitable for automotive glazing, to be produced.

The sample laminates in the series 17 to 25 were produced by autoclaving at 125° C. and 150 pounds per square inch pressure for 40 minutes with the adhesive interlayers between the glass plies and the rigid thermoplastic polyurethane ply. Samples 17 to 19 exhibit the good energy absorption obtained with low modulus thermoplastic polyurethane even when the thickness of the interlayer plies used was reduced to as little as 0.078 mm (Sample 18). Sample 20 shows that the use of Tecoflex polyurethane remains effective even at temperatures as low as −21° C. Samples 21, 22 and 26 show use of alternative interlayer materials at ambient temperature. The results with Samples 23 to 25 show the significant fall off in performance when using polyvinylbutyral significantly below ambient temperature.

The optics of the sample laminates tested were generally good, except in the case of Sample 26, which was hazy.

TABLE 1

| | Sample | | | | |
|---|---|---|---|---|---|
| Designation | Glass | Interlayer | Rigid Thermoplastic Polyurethane (ISOPLAST) | Interlayer | Glass |
| 11 | 2.1 | — | 1.24 | — | 2.1 |
| 12 | 2.1 | — | 1.31 | — | 2.1 |
| 13 | 2.1 | — | 1.30 | — | 2.1 |

TABLE 1-continued

| | | | | | |
|---|---|---|---|---|---|
| 14 | 2.1 | — | 1.29 | — | 2.1 |
| 15 | 2.1 | fpu | 1.14 | fpu | 2.1 |
| 16 | 2.1 | fpu | 1.16 | fpu | 2.1 |
| comparison | 2.1 | fpu | 1.04 polycarbonate | fpu | 2.1 |
| 17 | 2.1 | 0.38 mm Tecoflex[1] | 1 | 0.38 mm Tecoflex[1] | 2.1 |
| 18 | 2.1 | 0.078 mm PE 399[1] | 1 | 0.078 mm PE 399[1] | 2.1 |
| 19 | 2.1 | 0.15 mm PE 399[1] | 1 | 0.15 mm PE 399[1] | 2.1 |
| 20 | 2.1 | 0.38 mm Tecoflex[1] | 1 | 0.38 mm Tecoflex[1] | 2.1 |
| 21 | 2.1 | 0.38 mm PE 192[2] | 1 | 0.38 mm PE 192[2] | 2.1 |
| 22 | 2.1 | 0.42 mm Saflex RB 11[3] | 1 | 0.42 mm Saflex RB 11[3] | 2.1 |
| 23 | 2.1 | 0.42 mm Saflex RB 11[3] | 1 | 0.42 mm Saflex RB 11[3] | 2.1 |
| 24 | 2.1 | 0.42 mm Saflex RB 11[3] | 1 | 0.42 mm Saflex RB 11[3] | 2.1 |
| 25 | 2.1 | 0.42 mm Saflex RB 11[3] | 1 | 0.42 mm Saflex RB 11[3] | 2.1 |
| 26 | 2.1 | 0.76 Sekisui PVB[4] | 1 | 0.76 Sekisui PVB[4] | 2.1 |

| Sample Designation | Total Absorption Energy (J) | Temperature °C. |
|---|---|---|
| 11 | 4.09 | 21 |
| 12 | 4.20 | 21 |
| 13 | 3.26 | 21 |
| 14 | 5.0 | 21 |
| 15 | 57.6 | 21 |
| 16 | 53.8 | 21 |
| Comparison | 23.5 | 22 |
| 17 | 52.5–74.8 | Ambient |
| 18 | 31.5 | Ambient |
| 19 | 37 | Ambient |
| 20 | 73.2 | −21° C. |
| 21 | 65.8–73.1 | Ambient |
| 22 | 64.9–73.9 | Ambient |
| 23 | 76.3 | 14° C. |
| 24 | 18.9 | 9° C. |
| 25 | 17.25 | 0.4° C. |
| 26 | 67.5–83.1 | Ambient |

[1]low modulus thermoplastic polyurethane
[2]low modulus thermoplastic polyurethane
[3]low modulus thermoplastic polyvinylbutyral available in commerce from Solutia of St. Louis, USA
[4]low modulus thermoplastic polyvinylbutyral available in commerce from Sekisui company

What is claimed is:

1. A laminated glazing comprising an impact resistant ply of rigid thermoplastic polyurethane sensitive to ultra-violet radiation and having a tensile modulus greater than 500 MPa, bonded to an outer glass ply by a low modulus interlayer having a tensile modulus of less than 100 MPa, and bonded on the opposing face to a second outer glass ply by a second low modulus interlayer having a tensile modulus of less than 100 MPa, wherein a ply or plies other than the rigid thermoplastic polyurethane ply absorbs or reflects ultra-violet radiation.

2. A laminated glazing as claimed in claim 1 wherein each outer glass ply is of ultra-violet absorbing glass containing at least 0.5% by weight of iron (calculated as $Fe_2O_3$).

3. A laminated glazing according to claim 1 wherein the impact resistant ply is laminated to at least one of the outer glass plies by an ultra violet absorbing ply.

4. A laminated glazing according to claim 3 wherein the ultra-violet absorbing ply is of thermoplastic polyurethane.

5. An intrusion resistant glazing for automotive use comprising the laminated glazing as claimed in claim 1, wherein the low modulus interlayers are thermoplastic.

6. A laminated automotive glazing as claimed in claim 5 wherein the glass plies each have a thickness in the range 1.5 to 2.6 mm.

7. A laminated automotive glazing as claimed in claim 5 wherein each of the glass plies is semi-toughened.

8. A laminated automotive glazing as claimed in claim 5 wherein the rigid thermoplastic polyurethane ply has a thickness in the range 0.5 to 1.5 mm.

9. A laminated automotive glazing as claimed in claim 8 wherein the rigid thermoplastic polyurethane ply has a thickness in the range 0.4 to 0.8 mm.

10. A laminated automotive glazing as claimed in claim 5 having a thickness of about 5 mm.

11. A laminated automotive glazing as claimed in claim 5 having a thickness of about 4 mm.

12. A laminated automotive glazing as claimed in claim 5 including a reflective metal layer.

13. A laminated automotive glazing as claimed in claim 5 having a glass ply on the interior side of the impact resistant ply and, adhered to said glass ply, an anti-spall layer.

14. A laminated automotive glazing as claimed in claim 5, being a windscreen, fixed sidelight, rearlight or rooflight.

15. A laminated automotive glazing as claimed in claim 5 in which each of the said glass plies is semi-toughened being an opening sidelight.

16. A laminated automotive glazing as claimed in claim 5 having a thickness in the range 4.5 to 5.5 mm wherein each of the glass plies has a thickness in the range 1.8 to 2.3 mm and the rigid thermoplastic ply has a thickness in the range 0.4 to 0.8 mm.

17. A laminated automotive glazing as claimed in claim 5 having a thickness in the range 3.5 to 4.5 mm wherein each of the glass plies has a thickness in the range 1.5 to 2 mm and the rigid thermoplastic ply has a thickness in the range 0.4 to 0.8 mm.

18. A laminated automotive glazing as claimed in claim 5 having a thickness in the range 5.5 to 6.5 mm wherein each of the glass plies has a thickness in the range 2.3 to 2.6 mm and the rigid thermoplastic ply has a thickness in the range 0.4 to 1.0 mm.

19. A laminated automotive glazing as claimed in claim 5 additionally comprising adhered to the rear glass face thereof, an anti-spall layer.

20. A laminated automotive glazing as claimed in claim 5 additionally comprising a solar control ply being a ply of polyethylene terephthalate carrying a reflective metal coating.

* * * * *